US011151331B1

(12) United States Patent
Santhar et al.

(10) Patent No.: US 11,151,331 B1
(45) Date of Patent: Oct. 19, 2021

(54) LAYERED NEURAL NETWORKS TO EVALUATE COMMUNICATION DISTRIBUTION

(71) Applicant: International Business Machines Corporation, Armonk, NY (US)

(72) Inventors: Sathya Santhar, Chennai (IN); Balamurugaramanathan Sivaramalingam, Paramakudi (IN); Samuel Mathew Jawaharlal, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/931,219

(22) Filed: May 13, 2020

(51) Int. Cl.
*G06F 40/35* (2020.01)
*G06F 40/216* (2020.01)
*G06K 9/62* (2006.01)
*G06N 20/00* (2019.01)
*G10L 15/16* (2006.01)

(52) U.S. Cl.
CPC ............ *G06F 40/35* (2020.01); *G06F 40/216* (2020.01); *G06K 9/6256* (2013.01); *G06K 9/6267* (2013.01); *G06N 20/00* (2019.01); *G10L 15/16* (2013.01)

(58) Field of Classification Search
CPC .............. G10L 15/22; G10L 2015/228; G10L 15/1815; G10L 15/1822; G10L 2015/088; G06F 40/30; G06F 3/167; G06F 16/3329; G06F 16/90332; G06F 16/908; G06F 16/24575; G06F 40/284; G06F 40/56; G06F 40/20
See application file for complete search history.

(56) References Cited

U.S. PATENT DOCUMENTS 6,363,415 B1    3/2002   Finney et al.
6,424,997 B1    7/2002   Buskirk, Jr. et al.
(Continued)

FOREIGN PATENT DOCUMENTS

WO     1996035994 A1    11/1996

OTHER PUBLICATIONS

Unknown, "Intelligent Email Receivers List," An IP.com Prior Art Database Technical Disclosure, Jun. 1, 2012 [Abstract Only].
(Continued)

*Primary Examiner* — Linda Wong
(74) *Attorney, Agent, or Firm* — Patterson + Sheridan, LLP

(57) ABSTRACT

Techniques for communication evaluation and routing are provided. A communication for distribution to a plurality of users is received from a sending user, and the communication is parsed using one or more natural language processing (NLP) techniques to determine a context. A plurality of scores is generated for the plurality of users by processing the context using a machine learning (ML) model. It is determined, based on a first score of the plurality of scores corresponding to a first user of the plurality of users, to transmit the communication to the first user. It is further determined, based on a second score of the plurality of scores corresponding to a second user of the plurality of users, to refrain from transmitting the communication to the second user. Additionally, the system transmits the communication to the first user, and refrains from transmitting the communication to the second user.

17 Claims, 5 Drawing Sheets

(56) References Cited

U.S. PATENT DOCUMENTS

| | | |
|---|---|---|
| 6,618,715 B1 | 9/2003 | Johnson et al. |
| 10,891,947 B1* | 1/2021 | Le Chevalier ...... G10L 15/1815 |
| 2002/0073195 A1 | 6/2002 | Hellerstein et al. |
| 2004/0153360 A1 | 8/2004 | Schumann |
| 2005/0005164 A1 | 1/2005 | Syiek et al. |
| 2005/0086186 A1 | 4/2005 | Sullivan et al. |
| 2010/0064012 A1 | 3/2010 | Cruse, Jr. |
| 2016/0112359 A1* | 4/2016 | Allen ...................... H04L 51/32 709/206 |
| 2018/0219830 A1 | 8/2018 | O'Brien et al. |
| 2019/0138267 A1* | 5/2019 | Mailey .................... G10L 15/22 |
| 2020/0259948 A1* | 8/2020 | Keohane ............... G06F 1/1694 |
| 2020/0274839 A1* | 8/2020 | Loi ......................... H04L 67/22 |
| 2020/0293678 A1* | 9/2020 | Feuz ....................... H04L 51/16 |
| 2021/0065705 A1* | 3/2021 | Ham ....................... G10L 15/30 |
| 2021/0157817 A1* | 5/2021 | Allen ................ G06F 16/24575 |

OTHER PUBLICATIONS

Unknown, "Manage Dynamic Distribution Groups," Microsoft, Feb. 7, 2020, 15 pages.

* cited by examiner

LAYERED NEURAL NETWORKS TO EVALUATE COMMUNICATION DISTRIBUTION

BACKGROUND

The present disclosure relates to machine learning, and more specifically, to utilizing machine learning to control distribution of communications.

In a wide variety of systems and environments, distribution lists are used to transmit communications and messages among users. For example, a user may address an email to a distribution list, which allows the message to be automatically sent to all users included on the list. Though such distribution lists are often a convenient way of addressing larger audiences, they are often misused. For example, these distribution lists allow inappropriate, unsolicited, or needless messages to easily (and at times, accidentally) be sent to large audiences, which wastes system resources and is a nuisance to most recipients. Some systems have attempted to mitigate these concerns using predefined rules built around public distributions, such as rules limiting who can send messages to the list. However, these rules are static and inflexible, and fail to account for a wide variety of common scenarios.

SUMMARY

According to one embodiment of the present disclosure, a method is provided. The method includes receiving, from a sending user, a first communication for distribution to a first plurality of users; parsing the first communication using one or more natural language processing (NLP) techniques to determine a first context of the first communication; generating a first plurality of scores for the first plurality of users by processing the first context using a first machine learning (ML) model; determining, based on a first score of the first plurality of scores corresponding to a first user of the first plurality of users, to transmit the first communication to the first user; determining, based on a second score of the first plurality of scores corresponding to a second user of the first plurality of users, to refrain from transmitting the first communication to the second user; transmitting the first communication to the first user; and refraining from transmitting the first communication to the second user.

According to a second embodiment of the present disclosure, a computer program product is provided. The computer program product comprises one or more computer-readable storage media collectively containing computer-readable program code that, when executed by operation of one or more computer processors, performs an operation. The operation includes receiving, from a sending user, a first communication for distribution to a first plurality of users; parsing the first communication using one or more natural language processing (NLP) techniques to determine a first context of the first communication; generating a first plurality of scores for the first plurality of users by processing the first context using a first machine learning (ML) model; determining, based on a first score of the first plurality of scores corresponding to a first user of the first plurality of users, to transmit the first communication to the first user; determining, based on a second score of the first plurality of scores corresponding to a second user of the first plurality of users, to refrain from transmitting the first communication to the second user; transmitting the first communication to the first user; and refraining from transmitting the first communication to the second user.

According to a third embodiment of the present disclosure, a system is provided. The system includes one or more computer processors, and one or more memories collectively containing one or more programs which, when executed by the one or more computer processors, performs an operation. The operation includes receiving, from a sending user, a first communication for distribution to a first plurality of users; parsing the first communication using one or more natural language processing (NLP) techniques to determine a first context of the first communication; generating a first plurality of scores for the first plurality of users by processing the first context using a first machine learning (ML) model; determining, based on a first score of the first plurality of scores corresponding to a first user of the first plurality of users, to transmit the first communication to the first user; determining, based on a second score of the first plurality of scores corresponding to a second user of the first plurality of users, to refrain from transmitting the first communication to the second user; transmitting the first communication to the first user; and refraining from transmitting the first communication to the second user.

DETAILED DESCRIPTION

Embodiments of the present disclosure provide techniques to utilize machine learning to help control message distribution systems. In one embodiment, dynamic rules are built based on a multi-layered neural network-based machine learning (ML) system to manage/control message exchanges for mail distributions. In some embodiments, the ML system utilizes feature selection, accumulates clusters with similar orientation preferences, and applies each feature to the activation layer(s), such that each activation layer can learn based on message exchanges and admin rules. In at least one embodiment, the learned features and/or weights, as well as the activation layers of models trained for individual users, can be combined and inherited into activation layers of an overall distribution list. This increases the accuracy of the message routing. Further, in some embodiments, the weights and/or features can be dynamically modified, such as when there are modifications to any of the inputs (e.g., when a user leaves or joins the list, when a user is promoted in the hierarchy, and the like).

Figure 1:
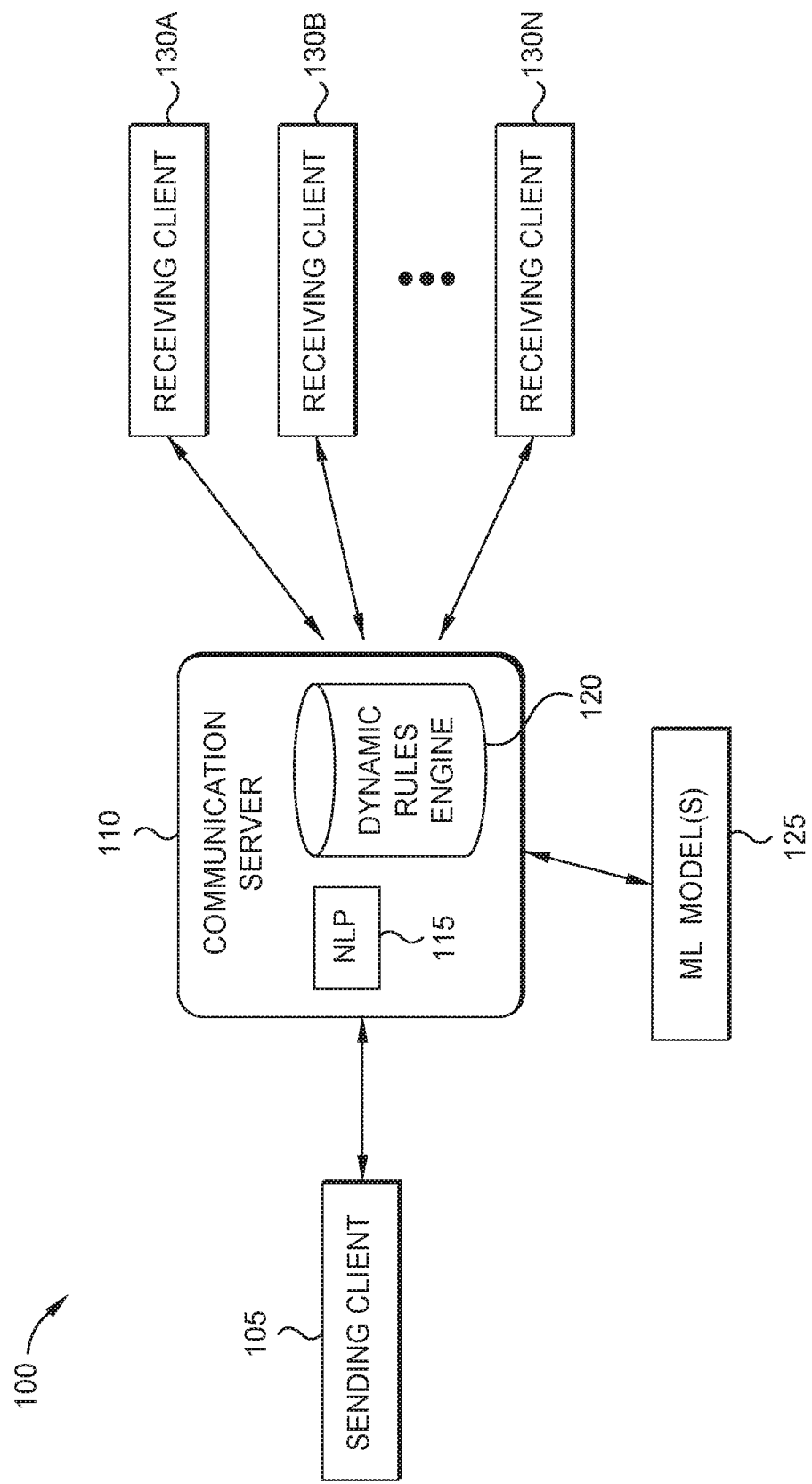
FIG. 1 illustrates a system configured to evaluate and route communications using machine learning, according to one embodiment disclosed herein.

FIG. 1 illustrates a system 100 configured to evaluate and route communications using machine learning, according to one embodiment disclosed herein. In the illustrated embodiment, a Sending Client 105 is communicatively coupled with a Communication Server 110, which acts as an intermediary to transmit messages in the system 100. Further, as illustrated, a number of Receiving Clients 130A-N are communicatively coupled with the Communications Server 110. Although depicted as a single Sending Client 105 and a set of Receiving Clients 130, in embodiments, any of the clients may act as a sending or receiving client for any given message. For example, the Receiving Client 130A may act as the sending client for a first message, while the Receiving Client 130B acts as the sending client when responding to that first message.

In the illustrated embodiment, the Communication Server 110 utilizes one or more components for natural language processing (NLP) 115, as well as a Dynamic Rules Engine 120, to route communications in the system 100. Further, as illustrated, the Communication Server 110 can utilize a set of one or more ML Models 125 to help build dynamic rules (e.g., using the Dynamic Rules Engine 120) and decide which Receiving Client(s) 130A-N should receive a given transmission. Although email is used in various examples herein, the system 100 can readily be applied to control routing of any message or communication.

In one embodiment, messages sent to a distribution list from any client device (whether the client device is included in the distribution list or not) are sent to a Communication Server 110, which applies NLP 115 to extract context and/or metadata from the transmission. For example, the NLP 115 may be used to identify the tone of the message, the topic/subject being discussed, the purpose of the message, and the like. In one embodiment, the Communication Server 110 evaluates the processed mail using one or more ML Model(s) 125. In one embodiment, these models reside in a remote location, such as a cloud server. This can allow the models to be shared among a number of Communication Servers 110 in various locations, and avoid overloading the servers while processing messages.

In one embodiment, the ML Models 125 include one or more layered neural network models which learn based on the inputs from one or more Communication Servers 110. In at least one embodiment, a separate ML Model 125 is maintained for each distribution list, such that each distribution list can have its own wired logic implementation and/or a differing number of layers/usages, as well as differing weights for output generation. In the illustrate system 100, the output of the ML Model(s) 125 can then be fed to the Dynamic Rules Engine 120 in the Communication Server 110 that is applicable for the distribution list. In at least one embodiment, the Dynamic Rules Engine 120 can similarly execute in a cloud environment, depending on the particular implementation.

In an embodiment, the Dynamic Rules Engine 120 can control different rule-dependent activities to trigger changes in routing the message(s). That is, the rules can modify how communications are sent to/from distribution lists, such as by modifying which recipient(s) receive the message. For example, suppose the distribution list includes one hundred recipients. In an embodiment, the system 100 can instead determine to transmit the message to only a subset of the clients (e.g., sixty of the one hundred recipients) based on the ML Model(s) 125 and Dynamic Rules Engine 120.

In some embodiments, the system 100 can continuously re-learn and refine its operations as changes are made. For example, if the relevant features change (e.g., new evaluation parameters are added), and/or changes to the inputs occur (e.g., when a user is added or deleted from the list). Further, in some embodiments, the system 100 can dynamically change the rules used if it is determined that one or more communications were forwarded that should not have been (or when a message was blocked when it should have been sent). This can include discarding unnecessary features that were earlier selected automatically. For example, suppose the Dynamic Rules Engine 120 determined that a particular message should be transmitted as normal to the list, but feedback (such as replies from one or more users) indicates that the message was not appropriate for the distribution list. In an embodiment, the system can utilize this feedback to refine the ML Model(s) 125 and build better rules.

In at least one embodiment, the neural networks can additionally or alternatively be implemented at the level of individual users (or levels in a hierarchy) in the environment. In one such embodiment, the parameters of these individual models can be inherited by the ML Model(s) 125 of each distribution list, in order to provide more accurate results. For example, suppose a first user typically sends messages with a negative tone because of his mood/personality. Ordinarily, the ML Model 125 of a given distribution list may limit or restrict such messages to certain users. However, a personalized neural network for the user can learn that this negative tone should not affect the routing decisions for the first user. Thus, by inheriting from the personalized model, the system can make an appropriate routing decision based on the individual user's history.

In one embodiment, the ML Model(s) 125 learn to map a sequence of inputs to a sequence of hidden/activation layers, with each hidden layer statistically learning about a given feature. The model(s) can further learn to map the hidden layers to a sequence of outputs. In an embodiment, therefore, the impact of each hidden layer is carried forwarded to the output(s). In at least one embodiment, the ML Model(s) 125 can use templates (e.g., relevant features) defined for a given distribution list, and learn to consolidate and/or discard layers of the model during the learning process. In at least one embodiment, for existing distribution lists, the model(s) can learn the relevant features and weights based on previously-transmitted transmitted messages in the system. For example, based on the prior messages, the system can learn to identify patterns of features that are appropriate or inappropriate for the list.

In some embodiments, each input neuron in an ML Model 125 corresponds to a user in the distribution list (at the sender end of the transmission). In one embodiment, at least one input is further included to represent users not in the distribution list. That is, this collective neuron may be used if the sending user is not included in the distribution list. If the sender is included on the list, the system may utilize the corresponding input for this user. In at least one embodiment, the system generates an input vector for the ML Model(s) 125 such that the input neuron corresponding to the Sending Client 105 is assigned "1," and all other inputs are set to "0."

Further, in one embodiment, each output neuron of the ML Model 125 represents a given user in the distribution list (at the receiving end of the transmission). In one such embodiment, the output of the ML Model 125 is a series of scores (e.g., values between zero and one), where the score for a given user is determined based on the value output by the corresponding neuron of the model. In order to determine whether a given Receiving Client 130A-N should receive the transmission, the system can then compare each score against one or more predefined thresholds. If the score is sufficiently high, the message is forwarded to the user. If the score is below the threshold, however, the system can refrain from transmitting the message to the user. In some embodiments, the blocked message(s) can instead or alternatively be forwarded to one or more administrators to determine whether the message should be forwarded to the identified user(s).

In an embodiment, any number and variety of features can be utilized in this evaluation. Additionally, in some embodiments, the dimensionality of the input features can be reduced, such as by logical grouping or by eliminating features which have relatively low attribute ranking, in order to streamline the models. Relevant input features for a given distribution list may include, for example, a personal weight of the sending user, a sensitivity of the message, a purpose of the message, a relevance of the message (relative to the purpose of the distribution list), a type of the message, and the like.

In one embodiment, the personal weight of the sending user is determined based on their importance/role in the system. In one such embodiment, based on an enterprise hierarchy, the system may assign an individual weight to each user, reflecting their role in the organization. For example, a low-level employee may be assigned a relatively low weight (indicating that it is likely inappropriate for them to contact an entire distribution list), while a higher employee may be assigned a higher weight (indicating that it is more likely they should be addressing the entire list).

In some embodiments, the sensitivity of the message is determined based on a label or other indication included in the message by the sender (e.g., labeling the message as high importance, high sensitivity, and the like). In at least one embodiment, the sensitivity can additionally or alternatively be determined using other techniques, such as by applying one or more NLP models to evaluate the text of the message and determine how sensitive/important the transmission is.

In an embodiment, the purpose of the communication can similarly be determined using one or more NLP techniques. For example, the system may evaluate the message to classify the purpose (e.g., seeking information, providing information, requesting assistance, and the like) of the sender. In some embodiments, the purpose can be more granular. For example, the system may differentiate between seeking information about a work-related topic (such as an upcoming conference), and seeking information about a non-work related topic (such as a sports event). This purpose can then act as an input feature that helps determine who should receive the message.

In one embodiment, the system can similarly determine the relevance of the message, with respect to the purpose of the distribution list. For example, suppose a user sends a message to an official distribution list for his office, indicating that he has misplaced his personal phone. Because the phone is personal, the system may determine it has relatively low relevance to the official distribution list, and therefore discard the message (or send it to fewer recipients). If the message indicates that the user has misplaced their security ID, however, the system may determine that this has high relevance to the list, and ensure it is sent to all users.

Continuing the above example, suppose one or more users respond that they have not seen the missing item. In one embodiment, the system may determine that these messages do not have particular relevance to the entire distribution list, and determine to only send them to the originally-requesting user. In contrast, if a user responds that they have found the item, the system may determine it is highly-relevant to the list (e.g., so that others can stop looking) and therefore transmit it to all users in the distribution list. In some embodiments, the type of the communication is also considered in this determination (e.g., a new message, a reply, a forward, and the like).

In one embodiment, the output of the model(s) is compared against one or more thresholds. If the threshold is exceeded for a given user, the system can transmit the message to that user. For those with a lower score, the system may block/refrain from sending the message. In at least one embodiment, the system can instead transmit the message to an administrator to take further action. In one such embodiment, the action taken by the administrator(s) on these blocked messages can be fed back into the system to further train and refine the model(s). In at least one embodiment, there can be rules applied that allow one or more features to override other features. For example, if the message is determined of be highly sensitive and the personal weightage is low, the system may set the values of all other features to a low score (e.g., zero).

In an embodiment, if the system blocks a message from any recipient, it notifies the original sender with a confirmation, warning, and/or rejection indication. This can allow the user to take action, if necessary/desired, to ensure that the message is sent directly to those blocked users. In at least one embodiment, the system can further include a justification as to why the message was blocked from one or more users (e.g., indicating that the relevance was determined to be low).

In some embodiments, users that receive the message can also respond or transmit a note directly to the system. When this response is processed using the Communication Server 110, it is similarly processed using the NLP 115, semantic modeling, ML Model(s) 125, and the like. This allows the system to learn and make rule changes based on a decision tree/table and the response. For example, if a user responds that another distribution list would be more appropriate (or that the communication is not relevant), the system can refine the model(s) and/or rules to better evaluate the next message.

Figure 2:
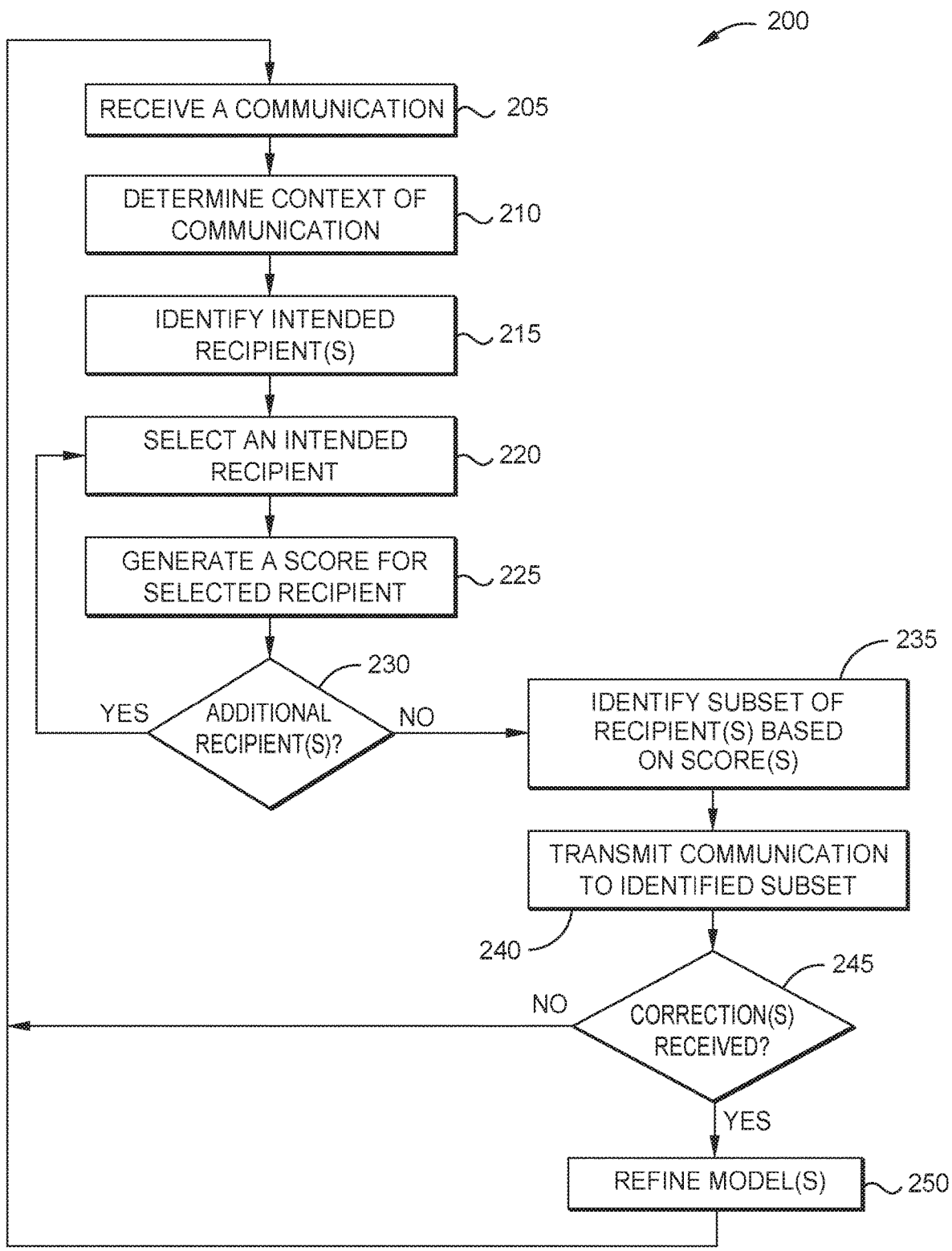
FIG. 2 is a flow diagram illustrating a method for evaluating and routing communications using machine learning, according to one embodiment disclosed herein.

FIG. 2 is a flow diagram illustrating a method 200 for evaluating and routing communications using machine learning, according to one embodiment disclosed herein. The method 200 begins at block 205, where a Communication Server 110 receives a communication from a sending client. At block 210, the Communication Server 110 determines the context of the message. In an embodiment, this includes evaluating the message using NLP or other techniques to extract the relevant features (e.g., purpose, relevance, and the like). The method 200 then continues to block 215, where the Communication Server 110 identifies the set of intended recipients for the communication.

In one embodiment, this includes identifying the distribution list(s) to which the sender addressed the message. As discussed above, in an embodiment, each distribution list can specify a number of users included on the list. When a message is sent to the list, it is forwarded to all of the indicated users. In some embodiments, the user can additionally or alternatively specify individual recipients. In one embodiment, the system can determine to remove recipients that are only included by virtue of the distribution list(s), but cannot remove recipients that were specifically listed by the sender. In another embodiment, the system can dynamically remove any recipient (including manually specified/selected recipients) using embodiments disclosed herein.

The method 200 then proceeds to block 220, where the Communication Server 110 selects one of the intended recipients. At block 225, the Communication Server 110 generates a score for the intended recipient. In one embodiment, this includes evaluating the determined context and/or the identity of the sender and/or recipient using one or more trained ML models, as discussed above. The method 200 then continues to block 230, where the Communication Server 110 determines whether there is at least one additional intended recipient that has not yet been evaluated. If so, the method 200 returns to block 220. Otherwise, the method 200 continues to block 235.

At block 235, the Communication Server 110 identifies a subset of users, of the original set of intended recipients, that should receive the communication. In one embodiment, this includes comparing the generated scores to one or more thresholds. For example, if the value exceeds a threshold, the Communication Server 110 can add the user to the subset. If the value is below a threshold, the Communication Server 110 can remove the user from the list (or refrain from adding them to the subset). In at least one embodiment, the Communication Server 110 can additionally or alternatively identify users who have been removed from the set of intended recipients, and transmit this list to an administrator and/or to the original sender for confirmation or approval.

The method 200 then continues to block 240, where the Communication Server 110 transmits the communication to the identified subset of recipients who should receive the message. In one embodiment, if the Communication Server 110 indicates the recipients who were excluded (e.g., to the original sender, and/or to an administrator), the sender/administrator can also manually select one or more of the excluded recipients. In one such embodiment, the Communication Server 110 can further transmit the communication to these selected recipients. At block 245, the Communication Server 110 determines whether one or more corrections have been received.

In an embodiment, a correction can include an indication that the sender and/or administrator selected one or more of the excluded recipients to receive the message. For example, the administrator may instruct the Communication Server 110 to transmit it to a given user, or may forward it directly to the user. Similarly, in some embodiments, identifying corrections can include evaluating subsequent communications (such as responses or replies) to determine whether the original communication was appropriate/proper for the set of recipients. If no corrections were received, the method 200 returns to block 205. Otherwise, the method 200 continues to block 250. At block 250, the Communication Server 110 refines the model(s) and/or dynamic rules based on the correction, in order to operate more accurately in the future.

Figure 3:
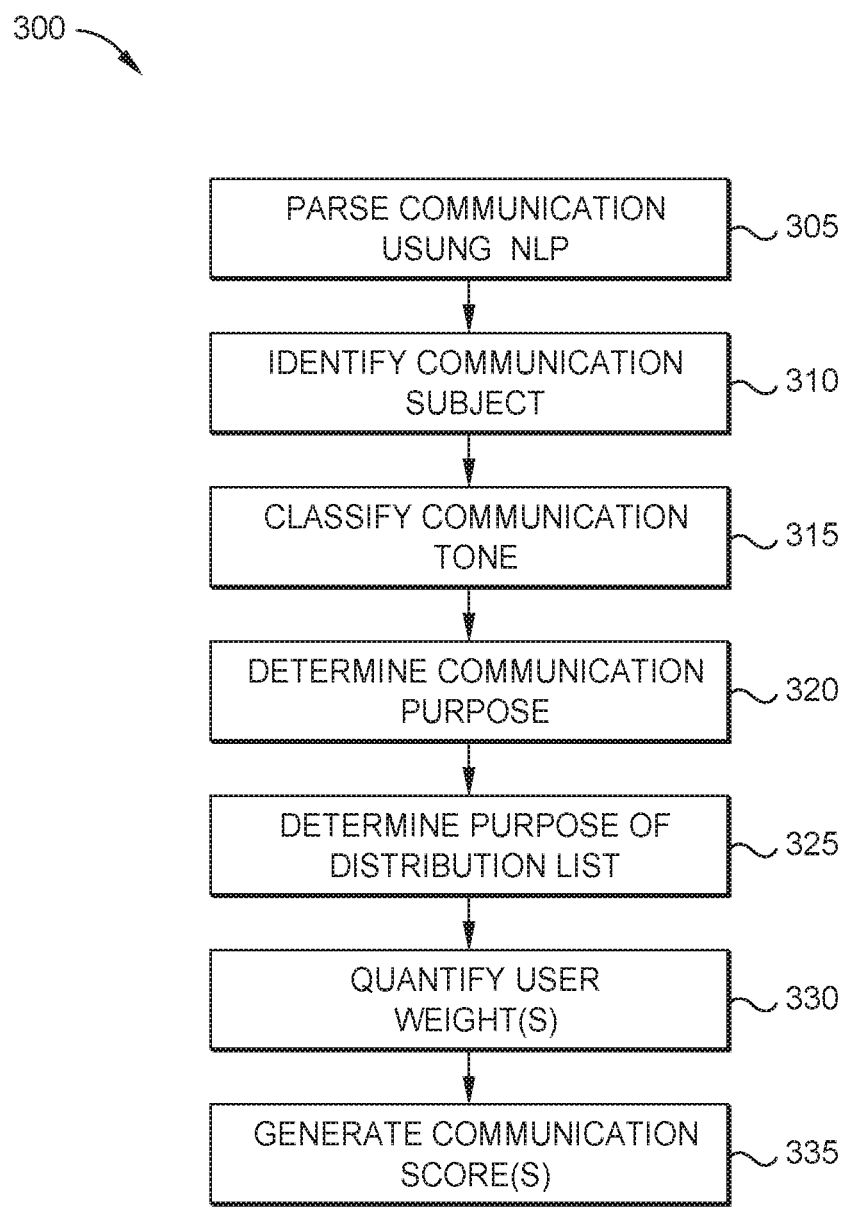
FIG. 3 is a flow diagram illustrating a method for evaluating communications using machine learning, according to one embodiment disclosed herein.

FIG. 3 is a flow diagram illustrating a method 300 for evaluating communications using machine learning, according to one embodiment disclosed herein. In one embodiment, the method 300 provides additional detail for evaluating message context and generating user scores. The method 300 begins at block 305, where a Communication Server 110 parses a received communication using one or more NLP techniques. Based on this evaluating, at block 310, the Communication Server 110 can identify/evaluate the subject of the communication. In one embodiment, this includes evaluating a designated subject/topic field. In some embodiments, this includes evaluating the overall message to determine the topic/subject, based on the NLP evaluation. For example, based on keywords used, the Communication Server 110 may determine that the subject of the communication relates to "office supplies."

The method 300 continues to block 315, where the Communication Server 110 classifies the tone of the communication based at least in part on the NLP evaluation. For example, the Communication Server 110 may determine a score or value for one or more tones/sentiments (e.g., a negativity/positivity score, an aggression score, and the like). The method 300 then proceeds to block 320, where the Communication Server 110 determines a purpose of the received communication.

In one embodiment, the purpose is similarly determined based on the NLP analysis. In some embodiments, the purpose of the communication is determined using keywords or other techniques to identify a type/category of intent (e.g., requesting information, providing information, requesting a service, and the like). In various embodiments, as discussed above, the determined purpose can include any level of specificity (e.g., requesting a particular item, as opposed to generically requesting any item). At block 325, the Communication Server 110 similarly determines the purpose of the distribution list to which the communication was addressed.

In some embodiments, each distribution list can be associated with a predefined purpose (e.g., specified by an administrator). In another embodiment, the purpose can be inferred based on the name of the list. For example, within a retail environment, a first distribution list may have an "inventory" purpose, while a second has a "staffing" purpose and a third has a "management" purpose. A single communication may be considered relevant or not relevant for any given list, depending on the determined purpose of the communication. For example, a message that supply of a given item is getting low may be appropriate for the "inventory" list, but not relevant to the "staffing" distribution list. In some embodiments, as discussed above, the Communication Server 110 evaluates the relevance of the message in determining whether to block it. Further, in at least one embodiment, the Communication Server 110 can similarly evaluate the relevance with respect to each intended recipient.

The method 300 continues to block 330, where the Communication Server 110 quantifies the user weight(s). In one embodiment, this includes evaluating an enterprise hierarchy to determine the weight of the sending user. In at least one embodiment, the Communication Server 110 may similarly evaluate the weight of each recipient, in order to determine whether the given recipient should receive the communication. Finally, at block 335, the Communication Server 110 generates one or more communication score(s) for the message and/or for each intended recipient, based on the above evaluations.

Figure 4:
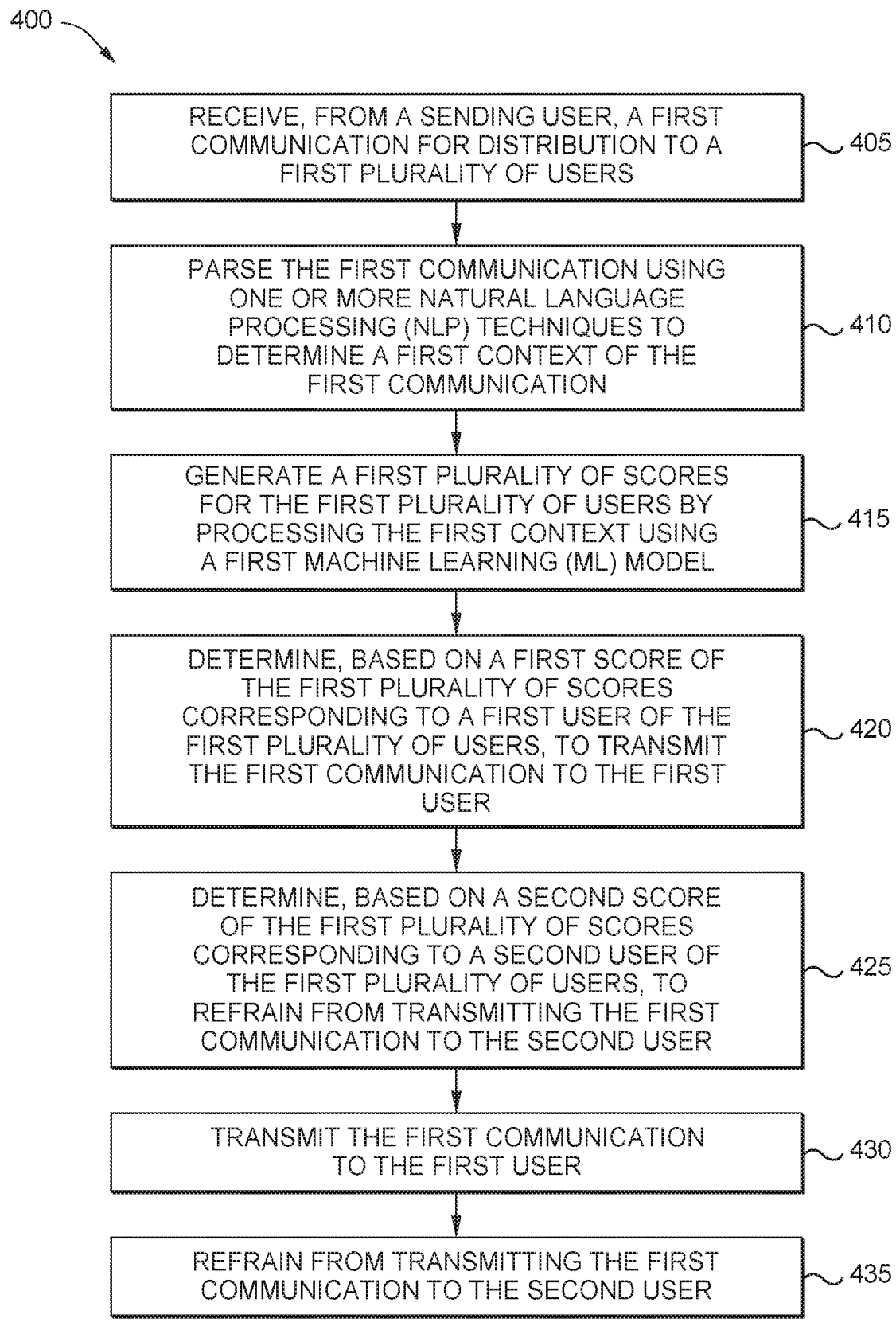
FIG. 4 is a flow diagram illustrating a method for utilizing machine learning to route communications, according to one embodiment disclosed herein.

FIG. 4 is a flow diagram illustrating a method 400 for utilizing machine learning to route communications, according to one embodiment disclosed herein. The method 400 begins at block 405, where a Communication Server 110 receives, from a sending user, a first communication for distribution to a first plurality of users. At block 410, the Communication Server 110 parses the first communication using one or more natural language processing (NLP) techniques to determine a first context of the first communication. The method 400 then continues to block 415, where the Communication Server 110 generate a first plurality of scores for the first plurality of users by processing the first context using a first machine learning (ML) model. Further, at block 420, the Communication Server 110 determines, based on a first score of the first plurality of scores corresponding to a first user of the first plurality of users, to transmit the first communication to the first user. Additionally, at block 425, the Communication Server 110 determines, based on a second score of the first plurality of scores corresponding to a second user of the first plurality of users, to refrain from transmitting the first communication to the second user. The method 400 then proceeds to block 430, where the Communication Server 110 transmits the first communication to the first user, and block 435, where the Communication Server 110 refrains from transmitting the first communication to the second user.

Figure 5:
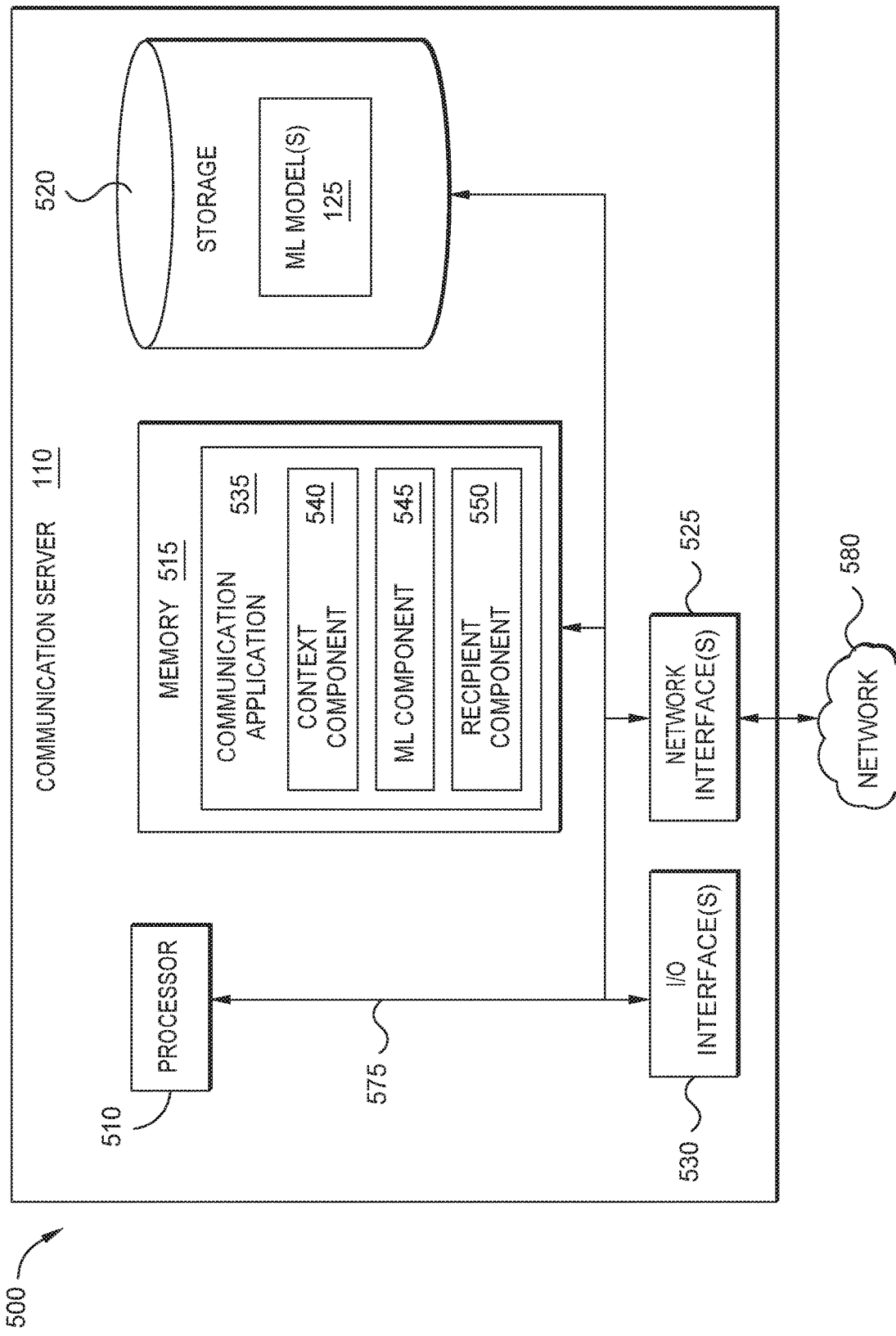
FIG. 5 is a block diagram depicting a communication server configured to route communications using machine learning, according to one embodiment disclosed herein.

FIG. 5 is a block diagram depicting a Communication Server 110 configured to route communications using machine learning, according to one embodiment disclosed herein. Although depicted as a physical device, in embodiments, the Communication Server 110 may be implemented as a virtual device or service, and/or across a number of devices (e.g., in a cloud environment). As illustrated, the Communication Server 110 includes a Processor 510, Memory 515, Storage 520, a Network Interface 525, and one or more I/O Interfaces 530. In the illustrated embodiment, the Processor 510 retrieves and executes programming instructions stored in Memory 515, as well as stores and retrieves application data residing in Storage 520. The Processor 510 is generally representative of a single CPU and/or GPU, multiple CPUs and/or GPUs, a single CPU and/or GPU having multiple processing cores, and the like. The Memory 515 is generally included to be representative of a random access memory. Storage 520 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 530. Further, via the Network Interface 525, the Communication Server 110 can be communicatively coupled with one or more other devices and components (e.g., via the Network 580, which may include the Internet, local network(s), and the like). Additionally, the Network 580 may include wired connections, wireless connections, or a combination of wired and wireless connections. As illustrated, the Processor 510, Memory 515, Storage 520, Network Interface(s) 525, and I/O Interface(s) 530 are communicatively coupled by one or more Buses 575.

In the illustrated embodiment, the Storage 520 includes a set of ML Model(s) 125. Although depicted as residing in Storage 520, in embodiments, the ML Models 125 may reside in any suitable location. In one embodiment, as discussed above, the ML Models 125 are trained based on historical messages. The ML Models 125 can evaluate communications, including the results of NLP analysis of the messages, in order to determine whether a given user should or should not receive the transmission.

The Memory 515 includes a Communication Application 535. Although depicted as software residing in Memory 515, in embodiments, the functionality of the Communication Application 535 can be implemented using hardware, software, or a combination of hardware and software. In the illustrated embodiment, the Communication Application 535 includes a Context Component 540, an ML Component 545, and a Recipient Component 550. Although depicted as discrete components for conceptual clarity, in embodiments, the operations of the Context Component 540, ML Component 545, and Recipient Component 550 may be combined or distributed across any number of components and devices.

In an embodiment, the Context Component 540 utilizes one or more NLP techniques to evaluate received communications. For example, the Context Component 540 may determine the topic/subject/purpose of the message, the tone of the message, and the like. In some embodiments, the Context Component 540 can further extract and identify other features of the message, such as the type of communication, the weight of the sending user, and the like. The ML Component 545 evaluates the context using one or more of the ML Models 125, in order to generate a score for each intended recipient of the communication. In one embodiment, as discussed above, a separate ML Model 125 can be maintained for each distribution list, where each output neuron of a given ML Model 125 corresponds to a particular recipient on the corresponding distribution list.

Further, in some embodiments, the ML Component 545 trains/refines the ML Models 125 based on historical and current communications. For example, the ML Component 545 may evaluate set of prior messages sent through the distribution list in order to train or refine an ML Model 125 for the list. Additionally, in at least one embodiment, the ML Component 545 can maintain an ML Model 125 for each individual user of the system. The ML Component 545 can utilize these models to supplement the model(s) for a given distribution list, in order to improve the accuracy and reliability of the system.

The Recipient Component 550 generally evaluates the generated scores in order to determine who should receive the communications. For example, in one embodiment, the Recipient Component 550 compares the scores against one or more predefined thresholds in order to determine, for each respective intended recipient, whether the intended recipient should receive the message. If so, the Recipient Component 550 can facilitate transmission of the communication to the recipient. If not, the Recipient Component 550 blocks transmission to the recipient. In at least one embodiment, if the Recipient Component 550 determines that a given user should not receive the message, the Recipient Component 550 returns an indication of the user to the sender and/or to an administrator. This can allow the sender/administrator to then determine whether the message should be sent to the blocked user regardless, or if other actions are appropriate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Communication Application 535) or related data available in the cloud. For example, the Communication Application 535 could execute on a computing system in the cloud and evaluate messages. In such a case, the Communication Application 535 could evaluate each message to determine which users should receive it, and store the relevant model(s) at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, from a sending user, a first communication for distribution to a first plurality of users;
   parsing the first communication using one or more natural language processing (NLP) techniques to determine a first context of the first communication;
   generating a first plurality of scores for the first plurality of users by processing the first context using a first machine learning (ML) model;
   determining, based on a first score of the first plurality of scores corresponding to a first user of the first plurality of users, to transmit the first communication to the first user;
   determining, based on a second score of the first plurality of scores corresponding to a second user of the first plurality of users, to refrain from transmitting the first communication to the second user;
   transmitting the first communication to the first user;
   refraining from transmitting the first communication to the second user;
   receiving, from the first user, an indication that the first communication was not appropriate for the first plurality of users; and
   refining the first ML model based on the indication.

2. The method of claim 1, wherein the first ML model is specific to the first plurality of users, the method further comprising:
   receiving, from the sending user, a second communication for distribution to a second plurality of users;
   parsing the second communication using one or more natural language processing (NLP) techniques to determine a second context of the second communication; and
   generating a second plurality of scores for the second plurality of users by processing the second context using a second ML model.

3. The method of claim 1, wherein the first context of the first communication comprises:
   (i) a subject of the first communication;
   (ii) a tone of the first communication;
   (iii) a personal weight of the sending user;
   (iv) a purpose of the of the first communication;
   (v) a type of the first communication; and
   (vi) a relevance of the first communication, with respect to the first plurality of users.

4. The method of claim 3, wherein the personal weight of the sending user is determined based at least in part on a structural hierarchy associated with the first plurality of users.

5. The method of claim 1, the method further comprising updating a set of dynamic rules based on the first ML model.

6. The method of claim 1, the method further comprising:
   transmitting, to the sending user, an indication that the first communication was not transmitted to the second user, wherein the indication further includes a reason.

7. One or more computer-readable storage media collectively containing computer program code that, when executed by operation of one or more computer processors, performs an operation comprising:
   receiving, from a sending user, a first communication for distribution to a first plurality of users;
   parsing the first communication using one or more natural language processing (NLP) techniques to determine a first context of the first communication;
   generating a first plurality of scores for the first plurality of users by processing the first context using a first machine learning (ML) model;
   determining, based on a first score of the first plurality of scores corresponding to a first user of the first plurality of users, to transmit the first communication to the first user;
   determining, based on a second score of the first plurality of scores corresponding to a second user of the first plurality of users, to refrain from transmitting the first communication to the second user;
   transmitting the first communication to the first user;
   refraining from transmitting the first communication to the second user;
   receiving, from the first user, an indication that the first communication was not appropriate for the first plurality of users; and
   refining the first ML model based on the indication.

8. The computer-readable storage media of claim 7, wherein the first ML model is specific to the first plurality of users, the operation further comprising:
   receiving, from the sending user, a second communication for distribution to a second plurality of users;
   parsing the second communication using one or more natural language processing (NLP) techniques to determine a second context of the second communication; and
   generating a second plurality of scores for the second plurality of users by processing the second context using a second ML model.

9. The computer-readable storage media of claim 7, wherein the first context of the first communication comprises:
(i) a subject of the first communication;
(ii) a tone of the first communication;
(iii) a personal weight of the sending user;
(iv) a purpose of the of the first communication;
(v) a type of the first communication; and
(vi) a relevance of the first communication, with respect to the first plurality of users.

10. The computer-readable storage media of claim 9, wherein the personal weight of the sending user is determined based at least in part on a structural hierarchy associated with the first plurality of users.

11. The computer-readable storage media of claim 7, the operation further comprising updating a set of dynamic rules based on the first ML model.

12. The computer-readable storage media of claim 7, the operation further comprising:
transmitting, to the sending user, an indication that the first communication was not transmitted to the second user, wherein the indication further includes a reason.

13. A system comprising:
one or more computer processors; and
one or more memories collectively containing one or more programs which when executed by the one or more computer processors performs an operation, the operation comprising:
receiving, from a sending user, a first communication for distribution to a first plurality of users;
parsing the first communication using one or more natural language processing (NLP) techniques to determine a first context of the first communication;
generating a first plurality of scores for the first plurality of users by processing the first context using a first machine learning (ML) model;
determining, based on a first score of the first plurality of scores corresponding to a first user of the first plurality of users, to transmit the first communication to the first user;
determining, based on a second score of the first plurality of scores corresponding to a second user of the first plurality of users, to refrain from transmitting the first communication to the second user;
transmitting the first communication to the first user;
refraining from transmitting the first communication to the second user;
receiving, from the first user, an indication that the first communication was not appropriate for the first plurality of users; and
refining the first ML model based on the indication.

14. The system of claim 13, wherein the first ML model is specific to the first plurality of users, the operation further comprising:
receiving, from the sending user, a second communication for distribution to a second plurality of users;
parsing the second communication using one or more natural language processing (NLP) techniques to determine a second context of the second communication; and
generating a second plurality of scores for the second plurality of users by processing the second context using a second ML model.

15. The system of claim 13, wherein the first context of the first communication comprises:
(i) a subject of the first communication;
(ii) a tone of the first communication;
(iii) a personal weight of the sending user;
(iv) a purpose of the of the first communication;
(v) a type of the first communication; and
(vi) a relevance of the first communication, with respect to the first plurality of users.

16. The system of claim 15, wherein the personal weight of the sending user is determined based at least in part on a structural hierarchy associated with the first plurality of users.

17. The system of claim 13, the operation further comprising updating a set of dynamic rules based on the first ML model.

* * * * *